US006695911B2

(12) United States Patent
Ramesohl et al.

(10) Patent No.: US 6,695,911 B2
(45) Date of Patent: Feb. 24, 2004

(54) METHOD AND INSTALLATION FOR PRODUCTION OF CEMENT CLINKER

(75) Inventors: Hubert Ramesohl, Bergisch (DE); Hans-Wilhelm Meyer, Langenzenn (DE)

(73) Assignee: KHD Humboldt Wedag AG, Cologne (DE)

( * ) Notice: Subject to any disclaimer, the term of this patent is extended or adjusted under 35 U.S.C. 154(b) by 0 days.

(21) Appl. No.: 10/123,043

(22) Filed: Apr. 15, 2002

(65) Prior Publication Data

US 2002/0174806 A1 Nov. 28, 2002

(30) Foreign Application Priority Data

Apr. 24, 2001 (DE) .......................................... 101 19 977

(51) Int. Cl.[7] ................................................. C04B 7/36
(52) U.S. Cl. ...................... 106/745; 106/756; 106/757; 106/789
(58) Field of Search ................................ 106/745, 757, 106/756, 789

(56) References Cited

U.S. PATENT DOCUMENTS

| 5,374,309 | A | * | 12/1994 | Piniecki | 106/714 |
| 5,392,998 | A | | 2/1995 | Sussegger et al. | 241/79.1 |
| 5,421,880 | A | * | 6/1995 | Young | 106/745 |
| 5,494,515 | A | * | 2/1996 | Young | 106/756 |
| 6,491,751 | B1 | * | 12/2002 | Watson | 106/756 |

* cited by examiner

Primary Examiner—Paul Marcantoni
(74) Attorney, Agent, or Firm—Charles L. Schwab; Nexsen Pruet, LLC

(57) ABSTRACT

In the production of cement clinker or cement with the addition of a cement additive (40), such as for example slag, which is ground in a closed-circuit grinding installation into slag meal (32) of equal fineness to cement, in order to utilize excess slag capacity in a beneficial way in the cement clinker production process, an intermediate slag fraction (33, 34) withdrawn from a three-fraction classifying device (31) is added as a raw material component to the stock inlet of the rotary kiln (20) of the cement clinker production line, and at the same time the chemical composition of the remaining raw material components (10) is adapted to the added quantity (34) of the intermediate slag fraction.

2 Claims, 1 Drawing Sheet

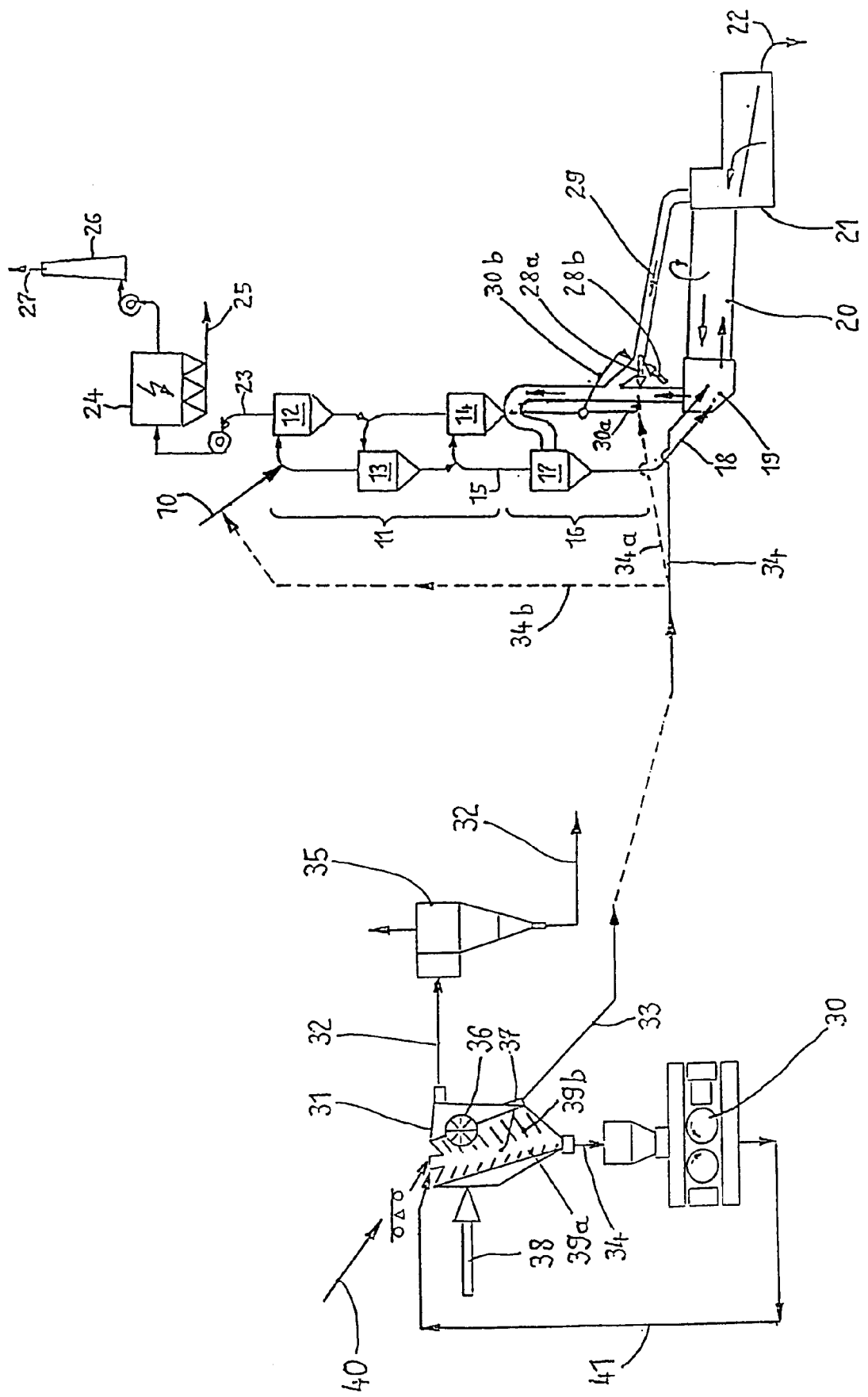

METHOD AND INSTALLATION FOR PRODUCTION OF CEMENT CLINKER

TECHNICAL FIELD

This invention relates to a method for production of cement clinker from raw meal, which is preheated in at least one heat-exchanger train through which the off-gas of a rotary kiln flows or is precalcined in a precalcination stage and, in the sintering zone of the rotary kiln, is burned to cement clinker, which is cooled in a downstream cooler, an unpreheated additive usable in the cement clinker production process, such as for example slag, being added to the process meal. The invention further relates to an installation for the performance of the method.

BACKGROUND OF THE INVENTION

In the production of cement clinker it is known to use, as a raw material component, slag arising in steelmaking, by introducing the slag directly into the stock inlet of the rotary kiln. The slag melts in the sintering zone of the rotary kiln and is there incorporated into the cement clinker being formed, which is then ground into portland cement.

On the other hand, it is known to grind latently hydraulic substances and other additives, for example granulated blast-furnace slag, jointly together with portland cement clinker into slag portland cement, usually in a ball mill, separate grinding and subsequent homogeneous mixing also being possible. The slag is often more difficult to grind than the cement clinker, so that it is known to grind the slag separately per se, for example in the nip of an energy-saving autogenous high-pressure roll press, and in this way to reduce the energy consumed in grinding and to achieve the optimal grinding fineness for each of the two grinding products.

Modern closed-circuit grinding installations with autogenous high-pressure roll presses and three-fraction classifiers, such as shown in U.S. Pat. No. 5,392,998 issued Feb. 28, 1995 to Albert Sussegger et al for a Sifter for Sifting Granular Material and Grinding System with Insertion of such a Sifter, have the principal aim of producing two cement products unequal in fineness in cement grinding at comparatively low cost in terms of investment and operating costs. They also make it possible, however, to grind grinding stock such as slag into the fines fraction or finished stock fraction carried off with the classifying air, into an oversize fraction recirculated to the roll press, and into an intermediate fraction as a second finished product of intermediate fineness. While the fines fraction, as finally fine slag meal, could be conveyed to a slag-meal bunker for subsequent mixing with the separately ground cement clinker in accordance with a specified formula in order to obtain granulated blast-furnace slag cement or slag cement, there has heretofore been no suitable use in cement production for an intermediate slag fraction that is coarser than cement. On the other hand, the production of the final fine slag meal in closed circuit slag grinding is greatly facilitated by the withdrawal of an intermediate fraction from the grinding circuit, because the grinding of slag or of granulated blast-furnace slag is energetically costly as a consequence of the difficult grindability.

OBJECTS AND SUMMARY OF THE INVENTION

In the production of cement clinker or cement with the addition of a cement additive such as slag, which is ground in a closed-circuit grinding installation to obtain slag meal of equal fineness to cement, it is an object of the invention to utilize excess slag capacity in a beneficial way in the cement clinker production process.

According to the invention, this object is achieved by the herein described method and equipment.

The invention proceeds from the notion of grinding additives usable in cement production, such as for example the slag arising in iron making or steel making, pozzolans, limestone or trass, separately from the cement clinker because of their difficult grindability. According to the invention it is now proposed to grind such difficult to grind additives in a closed-circuit grinding installation with mill and three-fraction classifying device, a so-called intermediate fraction with a fineness of, for example, 100%<200 $\mu$m being withdrawable as a second product from the classifying device as a third fraction, in addition to the fines fraction having, for example, 100%<32 $\mu$m and in addition to the oversize fraction (grit) recirculated to the mill. If in such a three-fraction classifying device this intermediate fraction is withdrawn from the grinding circuit, the throughput capacity of the closed-circuit grinding installation, for example slag grinding installation, can be enhanced quite substantially.

While the fines fraction withdrawn from the three-fraction classifying device is conveyed to a bunker as a product equal in fineness to cement, with the possibility of subsequent mixing with ground cement clinker in order to obtain mixed cement, the intermediate fraction withdrawn from this classifying device is added as a valuable raw material component to the process meal of the cement clinker production line, specifically by introduction into the inlet chamber of the rotary kiln and/or metering into the feedstock of the rotary kiln and/or to the calcinator and/or to the heat-exchanger train. The added quantity of the intermediate fraction from slag grinding replaces a portion of the cement raw material without having to be ground to the fineness of cement raw meal. The chemical composition of the remaining raw material components is adapted to the added quantity of the intermediate slag fraction.

The advantages associated with the invention are briefly summarized as follows:

Completely separate grinding of the unequally grindable substances, for example slag, pozzolans, trass, etc., on the one hand and cement clinker on the other hand. The additives can also be ground more finely than the cement clinker in the interest of optimal strength development of concrete prepared with the cement.

Enhancement of the throughput capacity of the closed-circuit slag grinding installation through removal of an intermediate fraction from the grinding circuit.

High moisture content, for example of granulated slags, does not upset the grinding process, because moist slags can be dried in the three-fraction classifying device.

Utilization of the intermediate slag fraction as a valuable raw material component in cement clinker production. Because of the similar chemical composition, silicate components of the raw-meal mixture (e.g., clays, sands, shales or bauxites) can be wholly or partly replaced by such an additive.

Because the intermediate slag fraction contains only a low level of moisture, hardly any water of crystallization and hardly any carbonates, practically no drying/dehydration and no calcination is necessary; thus addition of the intermediate fraction to the process meal in the region of the stock inlet of the rotary kiln, with bypassing of the heat-exchanger train if appropriate and of the calcinator if appropriate. Thus lower specific heat or fuel consumption in cement clinker production and lower emission of pollutants, such as for example also $CO_2$, in the off-gas.

Cooling of the rotary kiln inlet chamber, which is subject to severe thermal stress, by the introduced cold, unpreheated intermediate slag fraction, and thus enhancement of operational reliability.

The cold particles of the intermediate slag fraction introduced into the rotary kiln inlet chamber can act as condensation nuclei on which pollutants in gas or vapor form contained in the rotary kiln off-gas, such as in particular, for example, alkali chlorides and alkali sulfates, can condense (freeze out or sublime), and which can then be extracted from the kiln circuit if appropriate by gas substream extraction.

The closed-circuit grinding installation for the grinding of the additive, such as for example slag, advantageously has the energy-saving high-pressure roll press with autogenous size reduction of the slag material. The scabs of stock pressed in the roll press are then deagglomerated and classified into three fractions. The classifying device advantageously includes a three-fraction classifier of compact design with a static cascade classifier as preclassifying chamber, downstream of which is at least one rod cage of a dynamic classifier section, the rod cage being rotatably arranged in the classifier housing and provided with turbo elements on the periphery of the rotor, on the periphery of which rod cage the discharge of the intermediate slag fraction is arranged.

The static cascade classifier section has a V-shaped shaft-shaped housing with two classifying-zone boundary walls enclosed by the classifier housing and forming between them a classifying zone, and through which boundary walls classifying air or hot gas flows approximately in crosscurrent as drying gas, which boundary walls exhibit cascade-shaped or louver-shaped guide vanes obliquely inclined downwardly in the direction toward the discharge opening for the oversize classified fraction, these two guide-vane walls and the classifying zone lying therebetween being arranged obliquely at an angle departing from the vertical.

While the discharge of the intermediate fraction of the classifying device is connected, either directly or, for example, via truck hauling, for example to the stock inlet region of the rotary kiln, the discharge of the fines fraction of the ground slag, equal in fineness to cement, can be connected to the bunker for subsequent mixing with ground cement clinker in order to obtain mixed cement.

BRIEF DESCRIPTION OF THE DRAWING

The invention and its further features and advantages are explained in more detail on the basis of the exemplary embodiment schematically illustrated in the Drawing.

DETAILED DESCRIPTION OF THE INVENTION

The Drawing shows an installation for production of cement clinker from a cement raw meal, which is fed at 10 into a preheating stage 11, where it travels successively through cyclone suspension heat exchangers 12 to 14 in combined cocurrent/countercurrent to a hot off-gas 15 of a calcination stage 16 in order to be separated from the hot off-gas stream 15 in a lowermost cyclone 17 and introduced into an inlet chamber 19 of a rotary kiln 20 as a highly (e.g., 95%) calcined cement raw meal 18, in the sintering zone of the rotary kiln where it is burned to cement clinker. The cement clinker is subsequently cooled in a clinker cooler 21, a grate cooler being shown in the exemplary embodiment. The cooled cement clinker leaves the clinker cooler 21 at 22 and is subsequently conveyed to a cement clinker grinding facility, not shown.

The off-gas 23, cooled against the cement raw meal, leaves the preheating stage 11 via the upper cyclone 12. This off-gas 23 is treated in a dust collector, for example an electrostatic dust collector 24, to remove particulate matter 25 and is subsequently withdrawn as an off-gas 27 via a main stack 26.

In the calcination stage 16, which is supplied with fuel 28a, 28b and with a tertiary air 29 of the clinker cooler, the preheated cement raw meal 30a, 30b exiting the next-to-lowest cyclone stage 14 is calcined to a high degree. The fuel 28a is advantageously burned in richer than stoichiometric fashion in the kiln off-gas riser coming from the kiln inlet chamber 19 in order to generate a CO-containing reducing zone for the reduction of the pollutant $NO_x$ contained in the kiln off-gas, while the fuel 28b is advantageously burned in leaner than stoichiometric fashion in the tertiary air 29 coming from the clinker cooler 21.

According to the invention, a grinding installation is assigned to the cement clinker production line for the grinding of a substance 40, such as for example slag, which as a rule is more difficult to grind than the cement clinker. The slag grinding installation is advantageously a closed-circuit grinding installation, and it includes at least the following components: a mill, in particular a high-pressure roll press 30 for the energy-saving autogenous size reduction of the slag material, as well as a three-fraction classifier 31, which classifies the slag material into the three particle-size fractions, finished stock fraction or fines fraction 32, intermediate fraction 33, and oversize fraction (grit) 34 recirculated to roll press 30. The fineness of finally fine slag 32 withdrawn with the classifying air can be adjusted to a finished stock fineness of 100%<approximately 32 μm or >4000 Blaine. The finally fine slag 32 separated from the classifying air in a dust collector 35 can also be adjusted to be finer than the fineness of the ground cement clinker, which is ground in its own cement clinker grinding installation, not shown. In any case, the finally fine slag product 32 can be stored in a bunker for the purpose of the later production of a mixed cement. In times when there is a sufficiently large reserve of slag product, the slag grinding installation can also be employed for the grinding of cement clinker.

The fineness of the intermediate fraction 33 withdrawn from the slag grinding installation, the quantity of which can be, for example, 30% of the feedstock of the grinding installation, is adjusted to 100%<approximately 200 μm. This intermediate fraction 33, by the withdrawal of which the throughput capacity of the closed-circuit slag grinding installation can be substantially enhanced, is beneficially utilized in the cement clinker production process by being added to the process meal via a conveying device 34, implemented for example by truck hauling if the distance is too great, and specifically by direct introduction into the rotary kiln inlet chamber 19. The rotary kiln off-gas, which can easily have an exit temperature of, for example, 1200 to 1300° C. in the case of a modern rotary kiln 20, is abruptly cooled to a temperature of, for example, 1150° C. by the cold, unpreheated particles of intermediate fraction 33, so that the inlet chamber 19 can be continuously cooled and protected from excessive thermal stress. This intermediate fraction 33 of the slag is incorporated into the cement clinker in the sintering zone of the rotary kiln. The intermediate slag fraction 33 is thus a raw material component in cement clinker production, the chemical composition of cement raw meal 10 being adapted to the quantity and composition of added intermediate slag fraction 33.

The intermediate fraction 33 could also be metered into the feedstock 18 of the rotary kiln 20 and/or via path 34a, shown in dashed lines, into the raw meal being introduced into the calcination stage 16 and/or metered into the heat-exchanger train 11 via path 34b, shown in dashed lines.

The three-fraction classifier 31, shown in vertical cross section, has as preclassification chamber a static cascade classifier, downstream of which there is at least one rod cage 36 of a dynamic classifier section, the rod cage being rotatably arranged in the classifier housing and provided with turbo elements on the periphery of the rotor, on the periphery of which rod cage the discharge of the intermediate slag fraction 33 is arranged. The static cascade classifier section has a V-shaped shaft-shaped housing with two classifying-zone boundary walls enclosed by the classifier housing and forming between them a classifying zone 37, and through which boundary walls classifying air 38 or hot gas flows approximately in crosscurrent as drying gas, which boundary walls have cascade-shaped or louver-shaped guide vanes 39a, 39b obliquely inclined downwardly in the direction toward the discharge opening for the oversize classified fraction 34, these two guide-vane walls and the classifying zone 37 lying therebetween being arranged obliquely at an angle departing from the vertical.

The stock to be classified, a mixture of fresh slag 40 and recirculated press discharge stock or press scabs 41 in the exemplary embodiment illustrated, is introduced into the stock intake opening on the top of the static cascade classifier section. As the stock falls and impacts in particular on the guide vanes 39a, the classifier stock is classified in crosscurrent and at the same time agglomerates of the stock are deagglomerated. Perforated plates such as sieve plates, etc., can also be employed instead of the guide-vane walls 39a, 39b.

The as-delivered moisture content of the slag 40, for example granulated blast-furnace slag, can be for example 8 to 10%. In case of such high moisture contents of the additive, drying gas is used as classifying air 38, for example a substream of off-gas 23 of the cement clinker production line, by which the finally fine slag product 32 as well as the intermediate fraction 33 are dried to a residual moisture content of, for example, approximately 0.5%.

The additive 40 to be ground in the closed-circuit grinding installation, such as slag, pozzolans, trass, etc., can also be admitted to the grinding circuit at the roll press 30, specifically into its stock feed shaft, instead of at the classifier 31.

A three-fraction classifying device 31 can also be implemented by connecting two separate classifiers, one downstream of the other, specifically a static cascade classifier, downstream of which a dynamic rod-cage classifier or a static air-suspension classifier is connected as a post-classifier, the oversize discharge of the downstream classifier then representing the intermediate fraction 33 and the fines discharge of this classifier representing the fines fraction 32.

The invention also extends to classifying deices in which more than one intermediate fraction 33 can be withdraw

What is claimed is:

1. A method of production of Portland slag cement in an installation having a rotary kiln, a clinker cooler, a clinker grinder and a heat exchange train for preheating raw meal through which off gases from said rotary kiln and clinker cooler flow in route to the rotary kiln, comprising of steps of:

feeding ground raw meal to said rotary kiln via said heat exchanger train, grinding slag separate from said raw meal in a closed circuit grinding installation having a roll press and a three fraction classifying device which classifies the slag into a fines fraction having a fineness <32 $\mu$m, an intermediate fraction having a fineness of <200 $\mu$m and >32 $\mu$m and a oversize fraction having a fineness >200 $\mu$m, said oversize fraction being recirculated to said roll press, delivering said intermediate fraction and said preheated raw meal to said rotary kiln in which a cement clinker is produced, cooling said cement clinker, and delivering said cooled cement clinker and said fines fraction to said clinker grinder to produce Portland slag cement having a fineness of <32 $\mu$m.

2. The method of claim 1 including the step of drying said slag fractions by directing a portion of said off gases to said classifying device.

\* \* \* \* \*